United States Patent [19]
Hirano et al.

[11] 3,845,271
[45] Oct. 29, 1974

[54] OSCILLATING TYPE AUTOMATIC ARC WELDING APPARATUS

[75] Inventors: Osamu Hirano; Junichiro Kawasaki, both of Fukuyama; Tokuhiro Suzuki, Hiroshima-ken; Motoi Yamane; Noboru Takemoto, both of Fukuyama, all of Japan

[73] Assignee: Nippon Kokan Kabushiki Kaisha, Tokyo, Japan

[22] Filed: May 31, 1973

[21] Appl. No.: 365,732

[30] Foreign Application Priority Data
Nov. 30, 1972 Japan.............................. 47-137797

[52] U.S. Cl............................. 219/124, 219/125 R
[51] Int. Cl............................................. B23k 9/12
[58] Field of Search.......... 219/124, 125 R, 76, 122, 219/137, 130

[56] References Cited
UNITED STATES PATENTS
3,230,341  1/1966  Blackburn...................... 219/125 R
3,681,564  8/1972  Hiyama et al.................. 219/125 R
3,777,115  12/1973  Kazlauskas et al............. 219/125 R Primary Examiner—C. L. Albritton
Attorney, Agent, or Firm—Flynn & Frishauf

[57] ABSTRACT

The apparatus comprises a welding nozzle swingably supported at one end on a welder body by a supporting pivot, a connecting rod having one end rotatably secured to the nozzle at a portion adjacent its free end, a main shaft rotatably connected to the opposite end of the connecting rod, an eccentric splined member eccentrically secured to the main shaft, a coupling having a splined recess complimentarily engaging the splined member, and a motor having a motor shaft connected to the coupling so as to be eccentrically aligned to the main shaft, the eccentric rotation of the main shaft producing a vibration of the nozzle via the connecting rod, and eccentricity of the main shaft being changed by varying the engaging angle of the splined member relative to the splined recess.

5 Claims, 4 Drawing Figures

OSCILLATING TYPE AUTOMATIC ARC WELDING APPARATUS

BACKGROUND OF THE INVENTION

This invention relates to an automatic arc welding apparatus of an oscillating type capable of automatically welding a material, such as, steel pipe.

It is conventional in the arc welding of steel pipe or the like to employ two or three stationary electrodes. A device using such electrodes tends to form beads whose surface is ruggedly uneven when the electrodes are improperly positioned, and to form blowholes and undercuts or to cause slag inclusion or the like when the welding speed is high, thus decreasing a rate of yield of arc-welded product. To eliminate these defects, the material to be welded must be fed at a reduced speed, and at a further reduced speed particularly when heavy-wall steel pipe or high tensile strength steel pipe is to be arc welded. Efficiency of process is thus greatly reduced.

A device is also known in which the welding nozzle impressed with an electric voltage oscillates in the transverse direction of a weld clearance. This known device attains good working efficiency owing to its improved welding speed and qualitatively reduced welding defects. The device however has the defects that it requires complex arrangement for the oscillation of the nozzle and that the magnitude of oscillation can not be adjusted with ease.

SUMMARY OF THE INVENTION

The principal object of the invention is to provide an improved automatic arc welding apparatus comprising a simple nozzle oscillating mechanism and in which the oscillation of the nozzle can be easily adjusted.

DESCRIPTION OF THE PREFERRED EMBODIMENT

Figure 1:
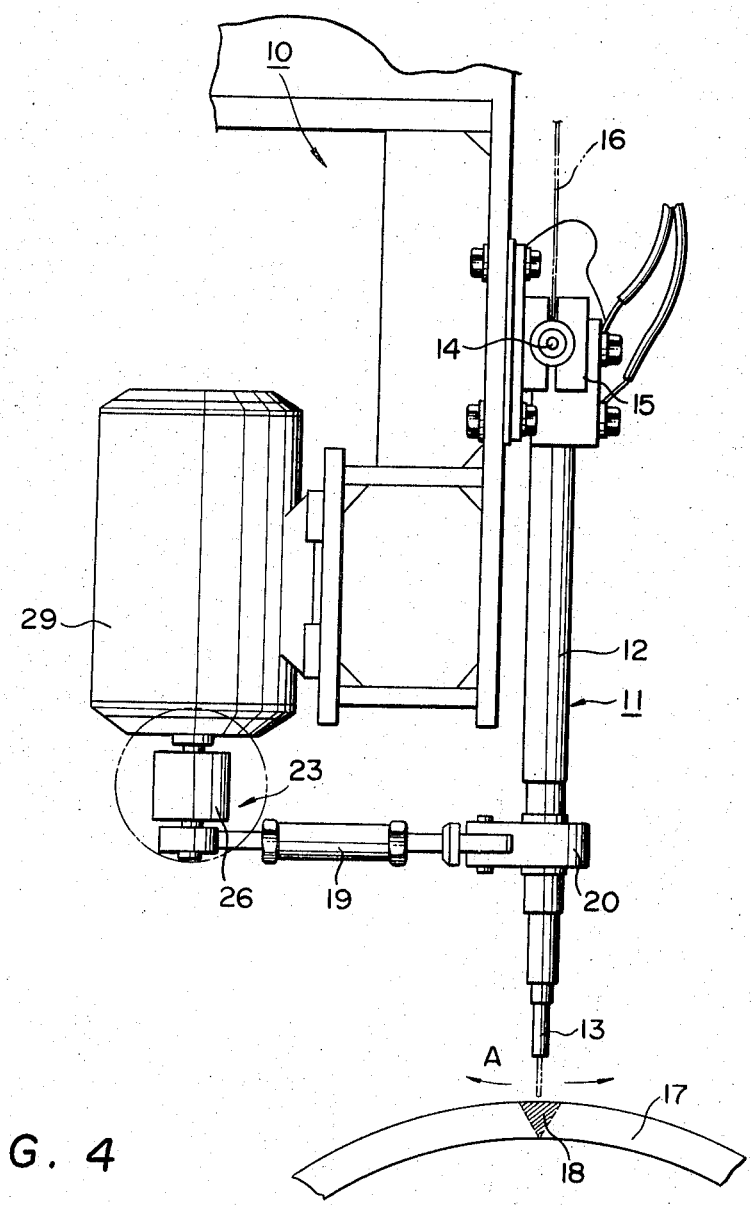
FIG. 1 is a schematic side elevation of an oscillating type automatic arc welding apparatus embodying this invention.

The automatic arc welding apparatus of the invention comprises a body 10 and a nozzle 11 swingably pivotally secured to the body 10. The nozzle 11 includes a hollow vertical support 12 having its lower end secured to a nozzle tip or an electrode holder 13. The support 12 is carried at its upper end by a supporting pivot 14 secured to the body through bearings 15 in such a manner that the nozzle 11 is swingable about the pivot 14 in the direction of arrow A. A welding rod 16 is received in the body of the nozzle 11 along its entire longitudinal length. The welding rod 16 is successively advanced toward the nozzle tip 13 and projected outwardly therefrom by means of a known feed mechanism not shown.

Material to be welded, such as, steel pipe 17, may be placed below the nozzle 11 such that a weld clearance 18 running in the steel pipe 17 lengthwise thereof lies directly below the nozzle tip 13, and may be moved by a suitable means not shown in a direction perpendicular to the plan of FIG. 1. In other words, the nozzle tip 13 projects perpendicular to the direction of movement of the steel pipe and is capable of oscillating in a transverse direction of the weld clearance 18. An electric voltage is impressed by a means well known in the art on the nozzle 11 and the steel pipe 17 to generate an electric arc.

Figure 2:
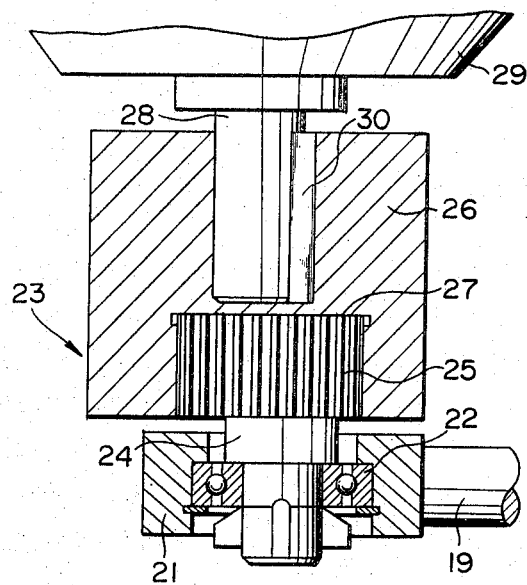
FIG. 2 is an enlarged cross section of an eccentric drive means used in the apparatus of FIG. 1.

A connecting rod 19 which is movable in a horizontal plane is connected via a connector 20 to a lower portion of the nozzle 11 in substantially perpendicular thereto. In particular, the connector 20 is mounted on the nozzle 11 in a cantilever fashion in such a manner that it normally permits horizontal movement of the connecting rod 19 but prohibits the free movement thereof in a vertical direction. If desired, however, the position of the connecting rod 19 can be vertically moved by unscrewing fastening screws not shown to permit the connector 20 to axially slide along the nozzle. The connector 19 has its opposite end provided with a ring 21 which rotatably receives via a bearing 22 a main shaft 24 of an eccentric spline mechanism 23 which operates to cause reciprocation of the connecting rod 19. As best shown in FIG. 2, the eccentric spline mechanism 23 comprises said main shaft 24, a splined member 25 eccentrically secured to the upper end of the main shaft 24, and a coupling 26 removably fitted on the splined member 25 via a splined recess 27. In order that the splined member may be eccentric to the coupling 26, the splined recess 27 is formed eccentric to the coupling. Further, the shaft 28 of an electric motor 29 is insertedly received by the upper end of the coupling 26 and fixedly secured thereto by a key 30 in coaxial relationship thereto and hence in an eccentric relationship to the main shaft 24. As viewed from FIG. 1, said main shaft 24 extends in parallel with the nozzle and in perpendicular to the connecting rod. Alternatively, the main shaft may be arranged perpendicular to the connecting rod and also perpendicular with respect to the nozzle.

Figure 3:
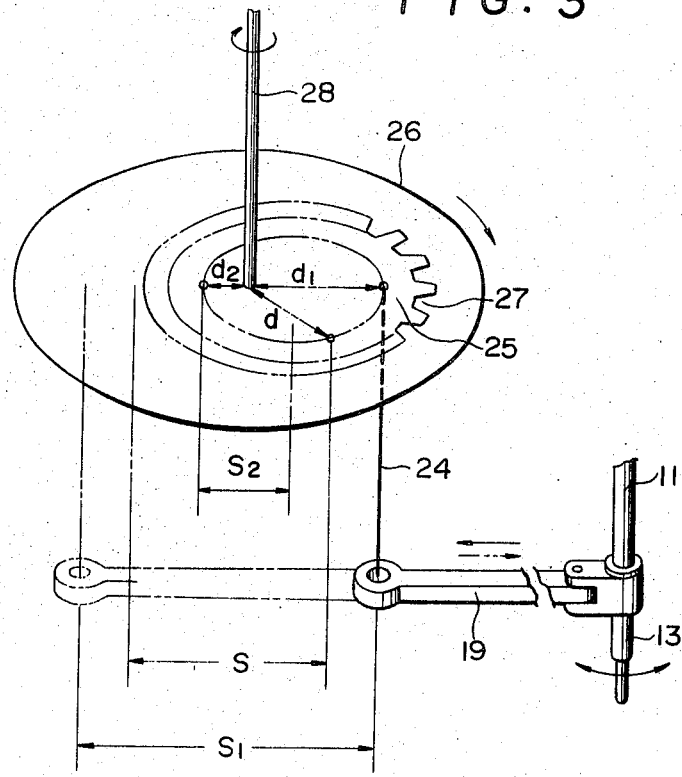
FIG. 3 is a simplified view illustrating the principle of operation of the eccentric drive means of FIG. 2.

Referring to FIG. 3, when the coupling 26 is rotated by actuation of the motor 29, the main shaft 24 which is eccentric to the coupling rotates eccentrically with respect to the axis of the motor shaft 28, allowing the connecting rod 19 to reciprocate to cause the oscillation of the nozzle 11 in the direction of arrow A. A stroke $S_1$ of the connecting rod is twice as much as the distance d between the central axis of the motor shaft 28 and that of the main shaft 24 and is substantially equivalent to an oscillatory stroke of the nozzle tip 13. As has been already described, the direction of oscillation of the nozzle is perpendicular to that of advancement of the material to be welded 17, in other words, it coincides the direction of width of the weld clearance 18.

In operation, the nozzle 11 is oscillated while the end of the welding rod 16 projecting from the tip end 13 of the nozzle is positioned at the weld clearance and at the same time the steel pipe 17 is advanced in the longitudinal direction. As is well known, an electric current is impressed on the welding rod and the steel pipe to generate an electric arc. To compensate molten metal to the fusing spot welding rod will be continuously supplied from the nozzle tip.

Figure 4:
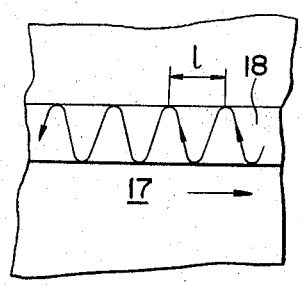
FIG. 4 is a plan view of a part of steel pipe showing the relationship between a weld clearance and the locus of the nozzle of the apparatus of FIG. 1.

The locus of travel of the nozzle tip with respect to the weld clearance forms a sine curve (FIG. 4) on the basis of oscillation of the nozzle and forward movement of the work. To obtain optimum operational conditions appropriate to the nature of material to be welded, cycle $l$ of the sine curve may be varied by adjusting the running speed of the work 17. For example, when heavy-wall steel pipe or high tensile strength steel pipe is to be treated, the feed speed of the work 17 may be reduced to shorten this cycle $l$. Thinwall steel pipe may be forwarded at a relatively high speed to increase this cycle.

In order to regulate the oscillatory stroke of the nozzle 11 in conformity with the width of the weld clearance 18, viz. the amplitude $h$ of the sine curve, the stroke S of the connecting rod 19 is made adjustable. Such adjustment can be achieved by altering the distance between the central axis of the motor shaft 28 and the main shaft 24, viz. eccentricity of the main shaft 24 with respect to the motor shaft 28. A change in eccentricity may be obtained by modifying the fixing angle of the splined member 25 onto the splined recess 27.

As described above, the connector 20 is fixedly secured on the nozzle 11 by bolts not shown and supports the splined member-main shaft-connecting rod assembly in a cantilever fashion. When the eccentricity should be changed, the fastening bolts are untightened and the connector is lowered from its upper extremity as shown along the nozzle 11 together with the connecting rod 19, main shaft 24 and the splined member 25, causing the splined member to be separated from the splined recess 27. The splined member is then rotated by the amount required and again fitted to the splined recess. As a result, the stroke S may be optionally regulated within the range of maximum stroke $S_1$ and minimum stroke $S_2$ in correspondence with the maximum eccentricity $d_1$ and the minimum eccentricity $d_2$ of the main shaft 24.

In the illustrated embodiment, separation of the splined member from the coupling is effected by changing the position of the connector by releasing the associated fastening means. Such separation may also be done by employing a known stopper means which secures the splined member and the coupling together in position, but is removable to release the engagement therebetween.

According to the invention, the welding nozzle can be easily oscillated by the simple spline mechanism. The magnitude of the oscillatory stroke of the nozzle can be readily adjusted by changing the fixing angle between the splined recess and the splined member.

What we claim is:

1. An automatic arc welding apparatus comprising:
   a welder body;
   a nozzle for supplying a welding rod;
   a supporting pivot for pivotally supporting one end of the nozzle on the welder body;
   a connecting rod mechanism having one end rotatably mounted on said nozzle in the vicinity of the other end of the nozzle from which the welding rod is supplied;
   an eccentric spline mechanism including a main shaft rotatably connected to the other end of said connecting rod mechanism, a splined member eccentrically secured to one end of said main shaft, and a coupling having a splined recess which complimentarily engages said splined member, said splined member being selectively movable with respect to said splined recess; and
   rotation drive means for rotating said coupling, said rotation drive means including a drive shaft which is coaxially connected to said coupling and has its central axis eccentric to that of said splined member, whereby the eccentric rotation of said main shaft produces a reciprocating movement of said connecting rod mechanism, causing the nozzle to be vibrated, and the eccentricity of said main shaft relative to the drive shaft is changeable by varying the angle of engagement of said splined member relative to the splined recess.

2. Apparatus according to claim 1 wherein said connecting rod mechanism is connected to said nozzle so as to be selectively slidable therealong.

3. Apparatus according to claim 1 wherein said connecting rod mechanism is perpendicular to said nozzle and said main shaft is perpendicular to said connecting rod mechanism.

4. Apparatus according to claim 3 wherein said main shaft is parallel to said nozzle.

5. Apparatus according to claim 1 wherein said drive means is an electric motor.

* * * * *